Patented Oct. 7, 1924.

1,510,735

UNITED STATES PATENT OFFICE.

RICHARD BAYBUTT, OF ROCHESTER, NEW YORK, ASSIGNOR TO EASTMAN KODAK COMPANY, OF ROCHESTER, NEW YORK, A CORPORATION OF NEW YORK.

CELLULOSE-ETHER PURIFICATION.

No Drawing.   Application filed October 31, 1922. Serial No. 598,217.

*To all whom it may concern:*

Be it known that I, RICHARD BAYBUTT, a citizen of the United States of America, residing at Rochester, in the county of Monroe and State of New York, have invented certain new and useful Improvements in Cellulose-Ether Purification, of which the following is a full, clear, and exact specification.

This invention relates to a separation of cellulose ethers from the etherification reaction mass and the purifying of them. One object of the invention is to provide a step during such purification which will neutralize the last traces of caustic soda adhering to the ether; that will cause the ether to produce clear transparent dopes when later dissolved, that will leave no undesirable residue on the ether when the latter is dried, that is not injurious to the strength of the ether or the flexibility of films produced from such ethers, and tends to bleach or whiten the ether or bodies present with them which tend to induce a yellow color.

I have discovered that the above objects may be attained by treating the ethers with an aqueous solution of sulfurous acid. The strength of such acid may vary widely. Ordinarily a dilute solution is all that is necessary. The reaction mass resulting from the etherification contains not only the cellulose ethers but solium salts, an excess of alkali and sometimes amounts of unconsumed etherifying agent and other organic compounds. The ethers may be obtained in purified form from this mass by washing with water and then thoroughly washing with dilute sulfurous acid, or the reaction mass may be washed directly with the sulfurous acid solution. This can conveniently be done in any usual or preferred apparatus or filter.

The dilute sulfurous acid not only neutralizes the last traces of alkali, say caustic soda which is absorbed by the ethers, but it leaves no undesirable residue on the ether when the latter is dried, the sulfur dioxide being completely volatile. Whenever, sulfuric acid, which has been heretofore commonly used, is left on the film through careless washing, the result is open to suspicion because prolonged action of even small amounts of very strong acid tend to degrade the material and tend to induce brittleness in the finished product. The use of sulfurous acid instead of sulfuric acid, therefore, permits of shorter or less careful washing after the acid treatment. The action of the sulfurous acid on either the ethers or small traces of bodies present with them, which tend to induce a yellow color, is to counteract or reduce such tendency by a bleaching action.

Having thus described my invention, what I claim as new and desire to secure by Letters Patent is:

In the process of obtaining cellulose ethers in purified form from the etherification reaction mass, the step of treating them with an aqueous solution of sulfurous acid.

Signed at Rochester, New York, this 25th day of October, 1922.

RICHARD BAYBUTT.